(12) United States Patent
Reynolds et al.

(10) Patent No.: US 12,717,606 B2
(45) Date of Patent: Aug. 25, 2026

(54) DATA ACCESS BY VIRTUAL PROCESSORS IN A DISTRIBUTED SYSTEM

(71) Applicant: HEWLETT PACKARD ENTERPRISE DEVELOPMENT LP, Spring, TX (US)

(72) Inventors: Keith Reynolds, Seattle, WA (US); Michael Berman, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 586 days.

(21) Appl. No.: 18/328,010

(22) Filed: Jun. 2, 2023

(65) Prior Publication Data

US 2024/0403101 A1 Dec. 5, 2024

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
CPC ....... G06F 9/45558; G06F 2009/45595; G06F 9/45504; G06F 2009/45579
See application file for complete search history.

(56) References Cited

U.S. PATENT DOCUMENTS 11,159,605 B2 10/2021 Nassi
11,240,334 B2 2/2022 Nassi et al.
2005/0080982 A1* 4/2005 Vasilevsky ............ G06F 3/0607 711/1
2019/0146825 A1* 5/2019 Dang ...................... G06F 9/455 718/1
2019/0149399 A1* 5/2019 Reed ................... H04L 41/0895 709/223
2022/0229688 A1* 7/2022 Dang .................. G06F 12/0891
2023/0099186 A1* 3/2023 Virtuoso ............... G06F 9/5072 718/1

OTHER PUBLICATIONS

Wikipedia, Markov decision process downloaded on May 25, 2023 (11 pages).

* cited by examiner

*Primary Examiner* — Kenneth Tang
(74) *Attorney, Agent, or Firm* — Trop, Pruner & Hu, P.C.

(57) ABSTRACT

In some examples, a distributed system includes a plurality of computer nodes comprising respective physical input/output (I/O) interfaces to a network-attached storage system. A virtual I/O interface is between a distributed virtual management program and a guest operating system (OS) of a virtual machine (VM). A plurality of virtual processors access the network-attached storage system through the virtual I/O interface in parallel using the respective physical I/O interfaces, where a first virtual processor in a first computer node is to use a data structure in the virtual I/O interface to submit a request to access data in the network-attached storage system and to receive a result of the request, and where the access of data from the network-attached storage system to satisfy the request is performed locally at the first computer node using the physical I/O interface of the first computer node. The distributed virtual management program maintains coherency of the data structure across multiple computer nodes.

20 Claims, 8 Drawing Sheets

DATA ACCESS BY VIRTUAL PROCESSORS IN A DISTRIBUTED SYSTEM

BACKGROUND

A distributed computing arrangement can include a cluster of computer nodes to provide increased processing throughput as compared to single-node systems. The computer nodes can execute respective programs that are to perform corresponding operations. In some cases, a distributed computing arrangement can include a virtualized distributed system that includes a virtualized environment in which programs can execute.

BRIEF DESCRIPTION OF THE DRAWINGS

Some implementations of the present disclosure are described with respect to the following figures.

Figure 1:
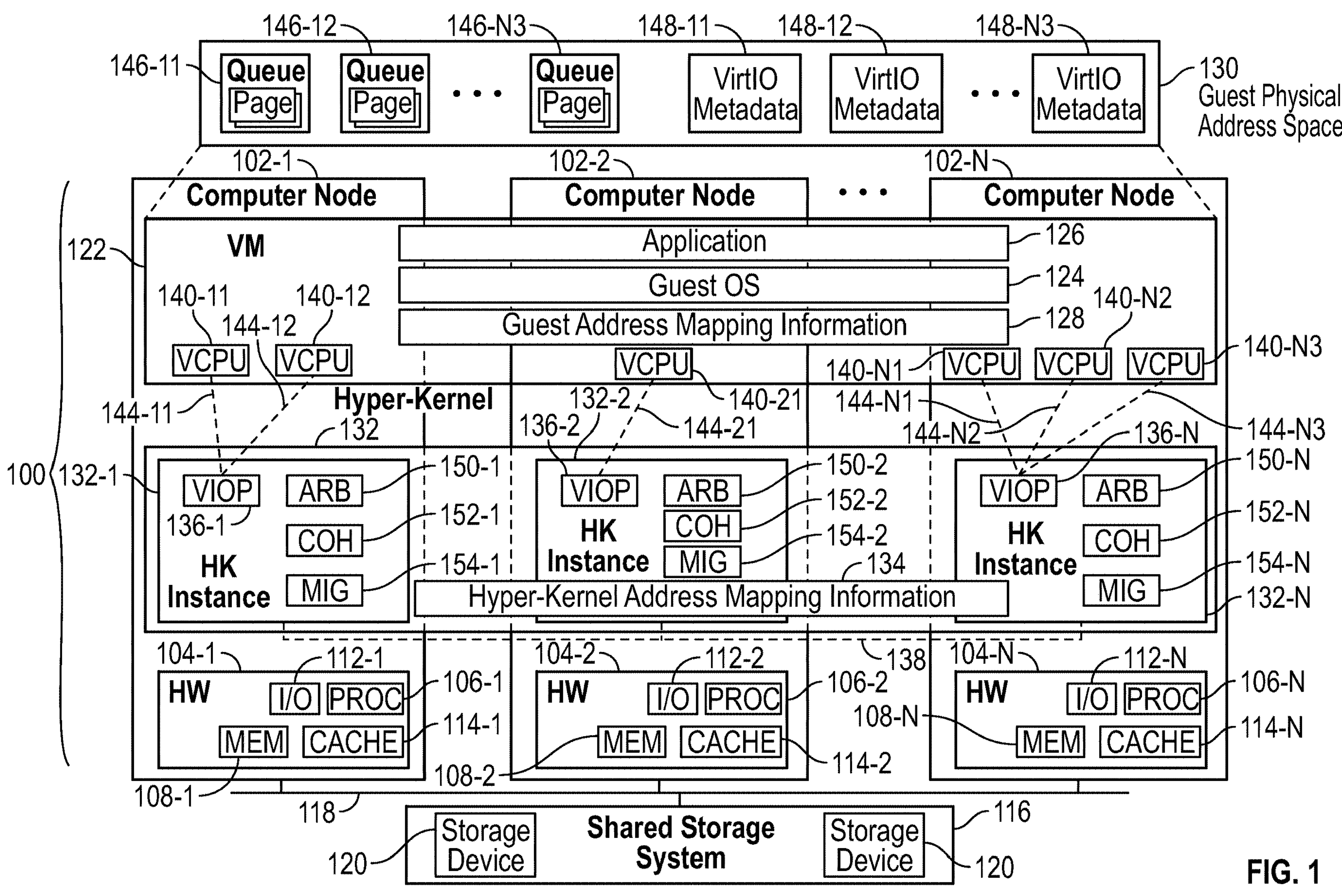
FIG. 1 is a block diagram of an arrangement that includes a cluster of computer nodes coupled to a shared storage system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An example of a virtualized environment of a virtualized distributed system is a virtual machine (VM) in which is executed an operating system (OS) (referred to as a "guest OS") and one or more application programs. In some examples, a computer node can execute one or more VMs. In such examples, multiple VMs are executed across a cluster of computer nodes.

In other examples, a VM can execute across multiple computer nodes. In such examples, rather than executing multiple VMs in a computer node, one VM can be executed on multiple computer nodes. A virtualized distributed system in which a VM can execute across multiple computer nodes can be referred to as a software defined server. The software defined server includes a distributed virtual management program that aggregates physical resources of the computer nodes of the virtualized distributed system and presents the aggregate of the physical resources to a guest OS of the VM. A virtual management program is also referred to as a hypervisor. A distributed virtual management program is referred to as a hyper-kernel (discussed further below).

A program (e.g., a guest OS, an application program, etc.) running in a VM of a software defined server can request access of data in a storage system. In some examples, the computer nodes of the software defined server can each be individually connected to a respective different storage system. A "storage system" includes one or more storage devices. In such examples, if a program in a first computer node requests access (read access or write access) of data in a storage system connected to a different second computer node, then the access request would have to be forwarded from the first computer node to the second computer node, which performs the requested data access and returns a result of the data access to the first computer node. The transfer of an access request and data of the access request (read data or write data) between computer nodes adds to latency in completing the access request, and consumes resources (processing resources, communication resources, memory resources, etc.) of the virtualized distributed system.

In other examples, a network-attached storage system can be connected over a network to the computer nodes of the software defined server. In such examples, any computer node can access the network-attached storage system over the network. The network-attached storage system can be referred to as a "shared storage system," since the storage system is accessible from any computer node of the software defined server. However, even in examples where a shared storage system is connected to the software defined server, a distributed virtual management program in the software defined server may not be able to efficiently handle data access requests originated at different computer nodes. For example, to process a data access request originated in or received at a first computer node, the first computer node may distribute work to multiple other computer nodes to access data associated with the data access request. Such distribution of work across multiple computer nodes can result in a substantial amount of traffic (including both data and metadata) between the multiple computer nodes.

In accordance with some implementations of the present disclosure, a virtual input/output (I/O) interface is deployed in a software defined server and includes data structures having respective queues to be used by virtual processors in a VM of the software defined server for submitting requests to access data of a network-attached storage system. The virtual I/O interface is deployed between the VM and the shared storage system (or more specifically, between the VM and a distributed virtual management program that manages access of the shared storage system). A given virtual processor in a given computer node uses a respective data structure in the virtual I/O interface to submit a request to access data in the shared storage system and receives a result of the request. The access of data in response to the request uses a local I/O connection of the given computer node to the shared storage system, so that the access of data to satisfy the request can be performed locally at the given computer node without involving any other computer node. The local processing of requests at the computer nodes reduces or eliminates traffic (including data and/or metadata) between computer nodes when processing the requests.

The distributed virtual management program in the software defined server maintains coherency of the data structure across multiple computer nodes to ensure that information in the data structure remains consistent so that a consumer of the data structure is reading the latest information that may have been written to the data structure by a writer. In a first scenario, the writer of information to the data structure may be the given virtual processor, and the consumer of the data structure may be a virtual I/O processor (discussed further below) in the distributed virtual management program. In this first scenario, the given virtual processor may add information of an access request (write request or read request) to the data structure, and the virtual I/O processor may read the information of the access request from the data structure.

In a second scenario, the writer of information to the data structure may be the virtual I/O processor, and the consumer of the data structure may be the given virtual processor. In this second scenario, the virtual I/O processor may add a result of an access request (e.g., an indication of a completion of a write request or read data responsive to a read request) to the data structure, and the given virtual processor may read the result of the access request from the data structure.

FIG. 1 is a block diagram of an example arrangement including a virtualized distributed system, which is referred to as a software defined server 100, according to some examples. The software defined server 100 includes a cluster of computer nodes 102-1, 102-2, . . . , 102-N (N≥2). A computer node is a physical processing platform that includes various hardware resources. For example, the computer node 102-1 includes hardware resources 104-1 that has a processing resource 106-1 to execute machine-readable instructions, a physical memory 108-1 to store information (including data and machine-readable instructions), an I/O resource 112-1 to perform I/O operations such as with a shared storage system 116, and a cache memory 114-1 to buffer information for faster access.

The other computer nodes 102-2 to 102-N similarly include respective hardware resources 104-2 to 104-N. The hardware resources 104-2 include a processing resource 106-2, a physical memory 108-2, an I/O resource 112-2, and a cache memory 114-2. The hardware resources 104-N include a processing resource 106-N, a physical memory 108-N, an I/O resource 112-N, and a cache memory 114-N.

A processing resource can include one or more hardware processors. A hardware processor can include a microprocessor, a core of a multi-core microprocessor, a microcontroller, a programmable integrated circuit, a programmable gate array, or another hardware processing circuit.

A physical memory can be implemented using one or more memory devices. A memory device can include any or some combination of the following: a dynamic random access memory (DRAM) device, a static random access memory (SRAM) device, a flash memory device, and so forth.

An I/O resource can include an I/O interface, such as a network adapter or network interface controller, to allow a computer node to communicate over a network, such as a communication fabric 118. Each I/O resource 112-*i* (i=1 to N) of a computer node 102-*i* provides a local I/O connection to the shared storage system 116 over the communication fabric 118. The communication fabric 118 can be implemented using any type of network, such as an Ethernet network, a Fibre Channel network, a Fibre Channel over Ethernet network, an Internet Small Computer System Interface (iSCSI) network, a Non-Volatile Memory Express over Fibre Channel network, a Compute Express Link (CXL) network, and so forth.

A cache memory can include one or more memory devices with higher access speeds than a main memory (which can be any of 108-1, 108-2, . . . , 108-N). A cache memory can include a hierarchy of cache memory devices at different levels. For example, one or more higher levels of cache memory devices (e.g., an L1 cache memory device and an L2 cache memory device) may be part of a hardware processor, and one or more lower levels of cache memory devices (e.g., an L3 cache memory device) may be external to a hardware processor.

A "shared" storage system is a storage system that is shared (i.e., accessible) over the communication fabric 118 by any computer node of the cluster of computer nodes 102-1 to 102-N. The shared storage system 116 is implemented using a collection of storage devices 120. As used here, a "collection" of items can refer to a single item or to multiple items. Thus, the collection of storage devices 120 can include a single storage device or multiple storage devices. Examples of storage devices can include any or some combination of the following: disk-based storage devices, solid state drives, and so forth.

In the software defined server 100, instead of running one or more VMs in each respective computer node 102-*i*, a VM 122 can run across the multiple computer nodes 102-1 to 102-N. Although FIG. 1 shows one VM 122, note that there can be at least one other VM that can run across the multiple computer nodes 102-1 to 102-N. The arrangement of FIG. 1 is referred to as a software-defined server because the computer nodes 102-1 to 102-N collectively form one virtual machine (VM 122) that hosts a guest operating system (OS) 124. The VM 122 further includes a collection of application programs 126 that run in the VM 122.

An application program 126 can run as a guest thread in a computer node. Multiple threads of the same application program 126 or different application programs 126 may run on multiple computer nodes. Also, multiple instances 132-1 to 132-N of a hyper-kernel 132 run in the respective computer nodes 102-1 to 102-N; the multiple hyper-kernel instances 132-1 to 132-N interact with one another over a network fabric, utilizing message passing over Ethernet or another type of interface to collectively provide functionalities of the guest OS 124 in the VM 122. The message passing is according to a message passing protocol that supports parallel computing in a distributed computing environment.

The VM 122 further includes guest address mapping information 128 that maps guest virtual memory addresses of a guest physical memory address space 130 (accessible by programs in the VM 122 including the guest OS 124 and the collection of application programs 126) to addresses of a hyper-kernel address space used by the hyper-kernel 132. The guest physical address space refers to locations of a guest physical memory. From the point of view of the guest OS 124, the guest physical memory is treated as a physical memory. However, the guest physical memory is a virtual memory (in the hyper-kernel address space) provided by the hyper-kernel 132.

The hyper-kernel 132 includes hyper-kernel address mapping information 134 that maps addresses in the hyper-kernel address space to a physical address space of the computer nodes 102-1 to 102-N. In some examples, the guest address mapping information 128 includes a guest page table, and the hyper-kernel address mapping information 134 includes an extended page table. A page table is a data structure that stores information to map between addresses of different address spaces. The guest page table and the extended page table together form a hierarchical arrangement of page tables for mapping between the guest physical memory address space 130 and the physical address space of the computer nodes 102-1 to 102-N. In other examples, the guest address mapping information 128 and the hyper-kernel address mapping information 134 can be implemented using other types of data structures.

The physical address space of the computer nodes 102-1 to 102-N includes physical addresses that refer to locations in the physical memories 108-1 to 108-N, the cache memories 114-1 to 114-N, and the shared storage system 116.

The hyper-kernel 132 includes software in each computer node that functions as a hypervisor. As depicted in FIG. 1, the hyper-kernel instances 132-1 to 132-N run in respective computer nodes 102-1 to 102-N. Each hyper-kernel instance 132-*i* (i=1 to N) emulates the hardware resources 104-*i* of the corresponding computer node 102-*i* and allocates the emulated hardware resources for use by the VM 122. The hyper-kernel 132 (acting as a distributed hypervisor) also manages the execution of the VM 122, including creating, tearing down, or modifying the VM 122. The hyper-kernel 132 can also manage the execution of other VMs if present in the software defined server 100.

The hyper-kernel instances 132-1 to 132-N are able to communicate with each other over a message passing interface 138, which can be a network interface such as Ethernet or another type of interface.

Each hyper-kernel instance 132-*i* can observe the software defined server 100 running in real time and optimizes resources of the respective computer node 102-*i* to match the requirements of the software defined server 100 during operation. The hyper-kernel instances 132-1 to 132-N unify (aggregate) the hardware resources 104-1 to 104-N of the computer nodes 102-1 to 102-N, and presents the unified set to the guest OS 124.

The emulation of the processing resources 106-1 to 106-N by the hyper-kernel instances 132-1 to 132-N provides virtual processors (or equivalently, virtual central processing units or VCPUs) in the VM 122. A VCPU can execute on the processing resource of a respective computer node. In the example of FIG. 1, VCPUs 140-11 and 140-12 run in the computer node 102-1, VCPU 140-21 runs in the computing node 102-2, and VCPUs 140-N1, 140-N2, and 140-N3 run in the computer node 102-N.

Each VCPU can execute a thread of an application program 126. A thread of an application program 126 running on a VCPU is referred to as a "guest thread." Guest threads of the application program(s) 126 can be scheduled by the guest OS 124 on respective VCPUs. From the perspective of the guest OS 124, each VCPU is a physical CPU on which a scheduler of the guest OS 124 can run a corresponding guest thread of an application program 126. A guest thread running on a VCPU can issue a request to perform an I/O operation, such as to access data of a virtual storage. The virtual storage is an emulated instance of the shared storage system 116.

A VCPU on a computer node 102-*i* is bound to a physical processor in the processing resource 106-*i* of the computer node 102-*i*. Binding a VCPU to a physical processor refers to presenting an emulated instance of the physical processor to the guest OS 124 as the VCPU. It is possible to migrate a VCPU from a source computer node to a destination computer node. If the VCPU is migrated, then the VCPU would be bound to a physical processor that is part of the processing resource of the destination computer node.

A virtual I/O processor (VIOP) also executes in each computer node 102-1 to 102-N. In some examples, each VIOP is implemented as part of a respective hyper-kernel instance. For example, the hyper-kernel instance 132-1 includes a VIOP 136-1, the hyper-kernel instance 132-2 includes a VIOP 136-2, and the hyper-kernel instance 132-N includes a VIOP 136-N.

To access a virtual storage, a VCPU interacts with a corresponding VIOP on the computer node on which the VCPU runs. In some examples, a virtual I/O interface is provided between each VCPU and a VIOP. As an example, the virtual I/O interface between a VCPU and a VIOP (or more generally, between the VM 122 and the hyper-kernel 132) is a VirtIO interface. The VirtIO interface is a standardized interface that allows a VM access to a virtual I/O device, such as a virtual storage.

The VirtIO interface uses a descriptor that includes information describing a respective I/O task to be performed. The I/O task can be requested by a VCPU, or more specifically, by a guest thread executing on the VCPU. In some examples, the VirtIO interface includes a queue of descriptors corresponding to respective I/O tasks to be performed. A chain of descriptors represents a collection of I/O tasks requested by an I/O request. As an example, an I/O request may specify that data be written into respective storage locations of the shared storage system 116. The storage locations may not be contiguous, so multiple I/O tasks are performed to write the data to the non-contiguous storage locations.

In some examples, the VirtIO interface can include multiple queues between a VCPU and a VIOP. Descriptors can be added to the multiple queues for different I/O requests issued by respective VCPUs.

As depicted in FIG. 1, dashed lines between VCPUs and VIOPs represent respective VirtIO interfaces. In the example of FIG. 1, a VirtIO interface 144-11 is provided between the VCPU 140-11 and the VIOP 136-1, and a VirtIO interface 144-12 is provided between the VCPU 140-12 and the VIOP 136-1. Additionally, a VirtIO interface 144-21 is provided between the VCPU 140-21 and the VIOP 136-2, and VirtIO interfaces 144-N1, 144-N2, and 144-N3 are provided between respective VCPUs 140-N1, 140-N2, and 140-N3 and the VIOP 136-N.

Each VirtIO interface includes a respective queue to allow interaction between a corresponding pair of a VCPU and a VIOP. In the present example, it is assumed that there is one queue per VirtIO interface. More generally, a VirtIO interface can include a collection of queues (a single queue or multiple queues). The queues of the VirtIO interfaces are part of the guest physical address space 130. In the example of FIG. 1, queues 146-11, 146-12, . . . , 146-N3 are part of respective VirtIO interfaces 144-11, 144-12, . . . , 144-N3.

Each queue includes a collection of pages (a single page or multiple pages), where a "page" refers to a unit of data of a given size. A VCPU can add descriptors of I/O tasks to one or more pages of a queue, and a VIOP can add information of a result of an I/O request to one or more pages of a queue. A VCPU can also retrieve read data from one or more pages of a queue.

The guest physical address space 130 also includes other data structures, including VirtIO metadata 148-11, 148-12, . . . , 140-N3 for the respective VirtIO interfaces 144-11, 144-12, . . . , 144-N3. Each VirtIO metadata includes information associated with a corresponding VirtIO interface. For example, the VirtIO metadata can include information indicating on which computer node a queue (or a page of the queue) is located.

The data structures of the guest physical address space 130 can be stored in a virtual memory of the VM 122, where a virtual memory is an emulated instance of one or more of the physical memories 108-1, 108-2, . . . , 108-N of the computer nodes 102-1, 102-2, . . . , 102-N. Thus, for example, a page of a queue of a VirtIO interface can be stored in a virtual memory that is an emulated instance of a physical memory. The data of a queue page can physically reside on a physical memory of a particular computer node. For example, the page(s) of the queue 146-11 may be stored in a virtual memory that is an emulated instance of the physical memory 108-1 in the computer node 102-1. At a later point in time, it is possible that the page(s) of the queue 146-11 may be migrated from the computer node 102-1 to another computer node, such as due to the VCPU 140-11 migrating to the other computer node and requesting access of the page(s) of the queue 146-11.

Each hyper-kernel instance 132-*i* includes a respective arbiter (ARB), coherency engine (COH), and migration engine (MIG). The arbiter, coherency engine, and migration engine can be implemented using machine-readable instructions of the hyper-kernel instance 132-*i*. In the example of FIG. 1, the hyper-kernel instance 132-1 includes an arbiter instance 150-1, a coherency engine instance 152-1, and a migration engine instance 154-1; the hyper-kernel instance 132-2 includes an arbiter instance 150-2, a coherency engine instance 152-2, and a migration engine instance 154-2; and the hyper-kernel instance 132-N includes an arbiter instance 150-N, a coherency engine instance 152-N, and a migration engine instance 154-N. Collectively, the arbiter instances 150-1 to 150-N form an arbiter (or more specifically, a distributed arbiter), the coherency engine instance 152-1 to 152-N form a coherency engine (or more specifically, a distributed coherency engine), and the migration engine instances 154-1 to 154-N form a migration engine (or more specifically, a distributed migration engine).

The arbiter is responsible for ensuring fairness in access of pages of data (including queue pages) by various entities in the cluster of computer nodes 102-1 to 102-N. For example, the arbiter can set an upper bound on how long a consumer of a queue page waits for access to the queue page, in a scenario where multiple entities are requesting access of the queue page at the same time. For example, a VCPU and a VIOP may concurrently attempt to access the queue page. To ensure fairness to both the VCPU and the VIOP, the arbiter can ensure that neither the VCPU nor the VIOP waits more than an upper bound delay time for a requested access of the queue page. If a consumer has waited too long for the queue page (i.e., the delay in access of the queue page is approaching the upper bound delay time), the arbiter may give higher priority to the request of the consumer for accessing the queue page. Delays in access of the queue page may be more likely in scenarios where the queue page has to be migrated back and forth among multiple computer nodes. Examples of migrations of queue pages are provided further below.

In other examples where multiple VCPUs are assigned to one queue, the arbiter can also arbitrate among the multiple VCPUs to ensure fairness, such as by setting the upper bound delay time for requested accesses by VCPUs.

The coherency engine is to maintain coherency of data in the various pages (including queue pages) due to contention by multiple entities for the pages. The maintenance of coherency ensures that any read of data in the pages (including queue pages) is of a correct version of data in the pages.

The migration engine manages the migration of VCPUs and pages (including queue pages) between computer nodes. As discussed further below, the migration engine includes a machine learning module that applies a machine learning process in deciding if VCPUs and pages are to be moved, and if so, to which computer nodes.

The arbiter instances 150-1, 150-2, . . . , 150-N can interact with one another over the message passing interface 138 to perform arbitration tasks, the coherency engine instances 152-1, 152-2, . . . , 152-N can interact with one another over the message passing interface 138 to maintain coherency of pages of data, and the migration engine instances 154-1, 154-2, . . . , 154-N can interact with one another over the message passing interface 138 to manage migrations of VCPUs and pages.

Figure 2:
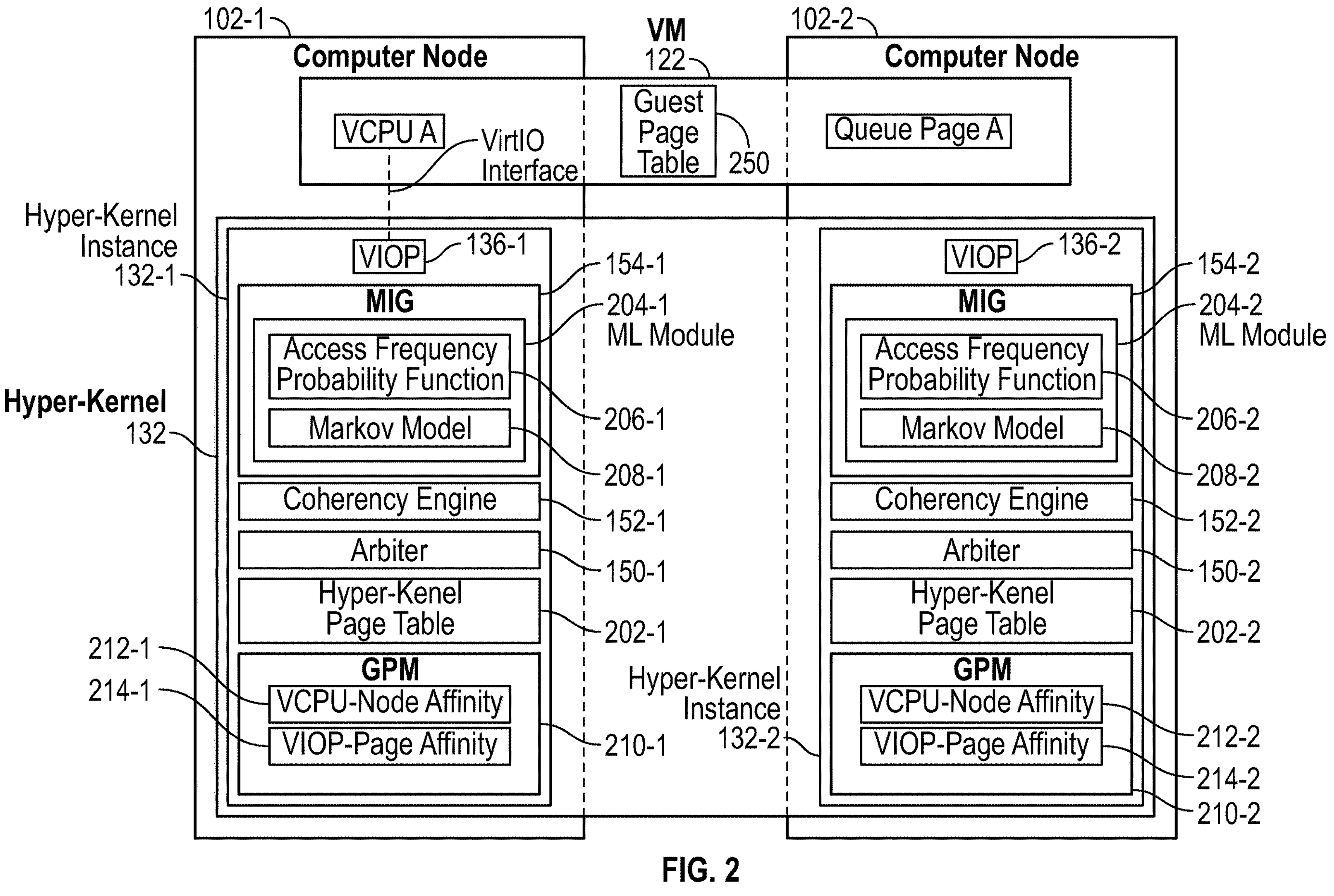
FIG. 2 is a block diagram of an arrangement that includes a cluster of computer nodes, a virtual machine (VM) across the computer nodes, and a hyper-kernel across the computer nodes, according to some examples.

FIG. 2 is a block diagram of an example arrangement including the computer nodes 102-1 and 102-2 to illustrate an example in which a VCPU (VCPU A) has issued a request to add a descriptor relating to an I/O access to a queue page (queue page A) that is on a different computer node than the computer node on which VCPU A is running. In the example of FIG. 2, VCPU A is running in the computer node 102-1, while the queue page A is stored at computer node 102-2. FIG. 2 also shows the VIOP 136-1 running in the computer node 102-1, and the VIOP 136-2 running in the computer node 102-2.

Note that initially VCPU A may have run on the computer node 102-2, but for some reason VCPU A was migrated from the computer node 102-2 to the computer node 102-1. An example of a reason for migrating VCPU A between computer nodes is that the VCPU may be running inefficiently on the computer node 102-2 and there is destination computer node (102-1) that is less loaded. In such a scenario, the migration engine may decide to migrate VCPU A from the computer node 102-2 to the computer node 102-1.

As further shown in FIG. 2, the VM 122 includes a guest page table 250. The guest page table 250 is an example of the guest address mapping information 128 of FIG. 1.

The hyper-kernel 132 includes a hyper-kernel page table, a migration engine, a coherency engine, and an arbiter. The hyper-kernel page table (also referred to as an extended page table) is an example of the hyper-kernel address mapping information 134 of FIG. 1.

As shown in FIG. 2, an instance of the hyper-kernel page table 202 resides in each computer node (hyper-kernel page table instance 202-1 in the computer node 102-1, and hyper-kernel page table instance 202-2 in the computer node 102-2). Also, the migration engine includes the migration engine instances 154-1 and 154-2 in the respective computer nodes 102-1 and 102-2, the coherency engine includes the coherency engine instances 152-1 and 152-2 in the respective computer nodes 102-1 and 102-2, and the arbiter includes arbiter instances 150-1 and 150-2 in the respective computer nodes 102-1 and 102-2.

Each migration engine instance 154-*i* includes a machine learning module 204-*i* that includes an access frequency probability function 206-*i* and a Markov model 208-*i*. The Markov model 208-*i* applies a Markov decision process, which is a discrete-time stochastic process for decision making. In other examples, other models can be used by the machine learning module 204-*i*. Parameters of the access frequency probability function 206-*i* and the Markov model 208-*i* can be dynamically adjusted as part of learning based on training data or on prior operations of the machine learning module 204-*i*.

Figure 3:
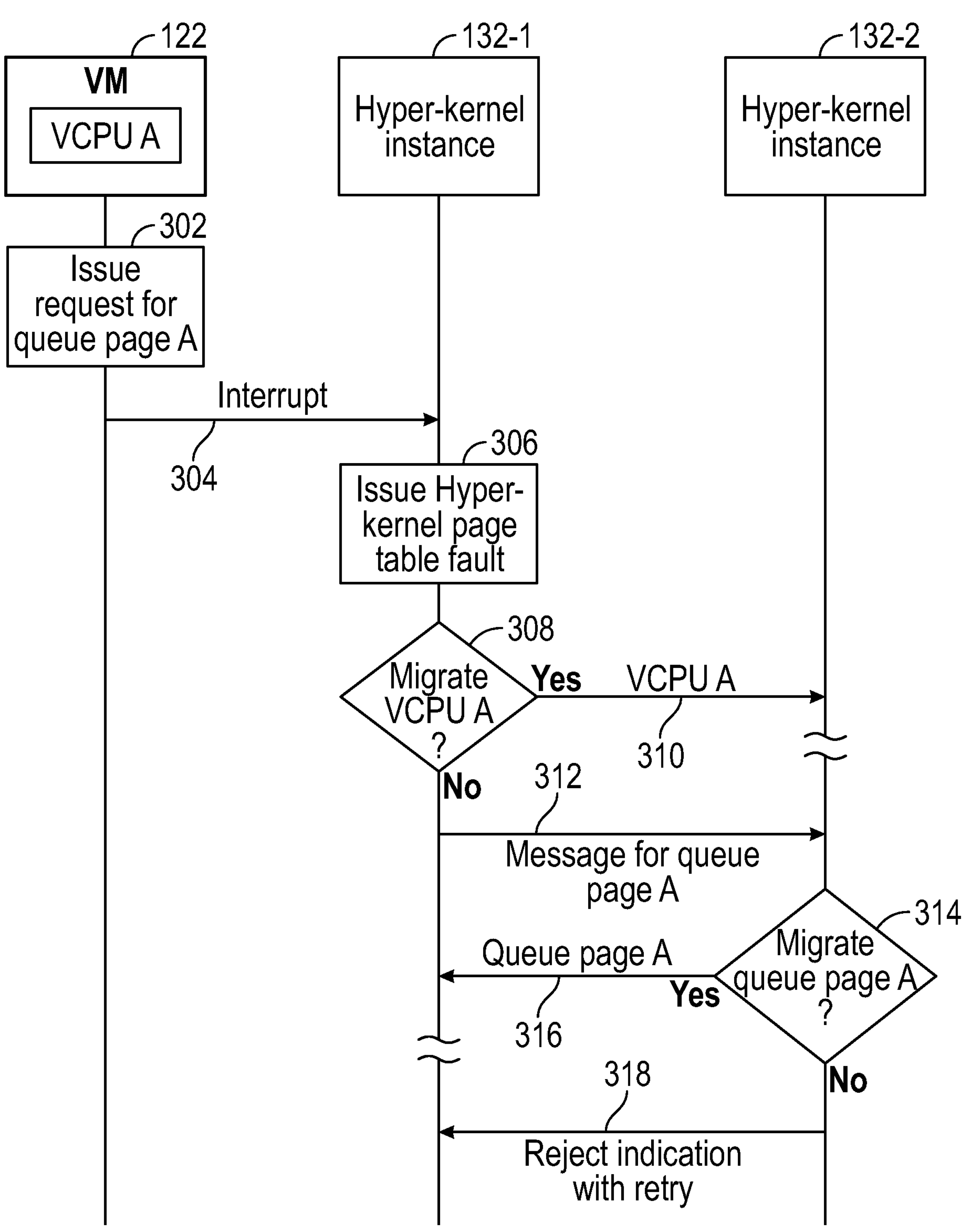
FIGS. 3 and 4 are flow diagrams of processes according to some examples.

As further shown in FIG. 3, to initiate an I/O access (a read access or write access), VCPU A issues (at 302) a request to update queue page A (210).

Since queue page A does not reside at the computer node 102-1, an access violation occurs because the requested resource is not available in the computer node 102-1, and in response, the VM 122 issues (at 304) an interrupt that is intercepted by the hyper-kernel 132. In response to the interrupt, because queue page A is not resident in the computer node 102-1, a hyper-kernel page table fault is issued (at 306) by the hyper-kernel page table instance 202-1 at the computer node 102-1.

In response to the hyper-kernel page table fault, the machine learning module instance 204-1 in the computer node 102-1 determines (at 308) whether VCPU A is to be migrated from the computer node 102-1 to another computer node, which in this case is the computer node 102-2 that contains queue page A.

Inputs considered by the Markov model 208-1 in the machine learning module instance 204-1 include VCPU-node affinity information 212-1 that is stored at the computer node 102-1, and whether VCPU A has issued a request to perform an I/O access (read or write of virtual storage). Other inputs may also be considered by the Markov model 208-1 to determine whether VCPU A should be migrated.

The VCPU-node affinity information 212-1 includes information indicating an affinity of each VCPU to each of the computer nodes in the cluster of computer nodes. The affinity of a VCPU to a computer node can be based on various factors, such as (1) the frequency at which the VCPU is accessing resources (e.g., pages) of the computer node, (2) how efficiently the VCPU runs in the computer node, (3) whether the VCPU is in the middle of executing an instruction set in the computer node, and so forth. The affinity between the VCPU and the computer node can be increased if the VCPU accesses resources of the computer node at a higher frequency. The affinity between the VCPU and the computer node can be decreased if the VCPU runs inefficiently in the computer node. On the other hand, the affinity between the VCPU and the computer node can be increased if the VCPU runs efficiently in the computer node. The affinity between the VCPU and the computer node can be increased if the VCPU is in the middle of executing an instruction set in the computer node (it would be inefficient to migrate the VCPU while the VCPU is executing the instruction set because the execution context would have to be moved along with any cached data).

Another input considered by the Markov model 208-1 is whether VCPU A has issued a request to perform an I/O access (read or write of virtual storage). If VCPU A has issued a request to perform an I/O access, then that would weigh more heavily in favor of keeping VCPU A at its current computer node (102-1), based on a goal of favoring local handling of I/O accesses of data in the shared storage system 116 (as opposed to forwarding I/O access requests to another computer node for handling).

The affinity between a VCPU and a computer node can be expressed using an affinity measure that is adjusted by the hyper-kernel 132 based on the various factors. The VCPU-node affinity information 212-1 is part of a global page map, which is a data structure to store metadata for pages including queue pages of a VirtIO interface. An instance of the global page map is stored in each computer node. FIG. 2 shows a global page map instance 210-1 in the computer node 102-1, and a global page map instance 210-2 in the computer node 102-2. The global page map instance 210-2 includes VCPU-node affinity information 212-2. The hyper-kernel 132 can maintain the global page map instances 210-1 and 210-2 in synchronization with one another (i.e., to ensure that the global page map instances remain identical as they are modified).

Each global page map instance 210-1 or 210-2 also includes respective VIOP-page affinity information 214-1 or 214-2. The VIOP-page affinity information indicates the affinity between a VIOP and a page, such as a queue page. If a VIOP is accessing (writing or reading) a page, then the VIOP-page affinity is set to a first value. On the other hand, if the VIOP is not accessing the page, then the VIOP-page affinity is set to a second value different from the first value. If a respective VIOP-page affinity indicating an affinity between a given VIOP and a given page (e.g., a queue page) is set to the first value, then that indicates a condition in which the given page should not be moved. However, once the given VIOP has completed its access of the given page, the respective VIOP-page affinity is reset to the second value to allow migration of the given page.

If the Markov model 208-1 of the machine learning module 204-1 outputs a decision that VCPU A is to be migrated, then the migration engine 154-1 migrates (at 310) VCPU A to the computer node 102-2.

On the other hand, if the Markov model 208-1 of the machine learning module 204-1 outputs a decision that VCPU A should not be migrated from the computer node 102-1, the migration engine instance 154-1 sends (at 312) a message for queue page A to another computer node. Metadata (e.g., VirtIO metadata in the guest physical address space 130 depicted in FIG. 1) may be stored at the computer node 102-1 indicating where queue page A is last known to be located. Assuming that the metadata indicates that queue page A is located at the computer node 102-2, the migration engine 154-1 sends the message for queue page A to the computer node 102-2.

The message contains information that is to be used at the computer node 102-2 in deciding whether or not to move queue page A from the computer node 102-2 to the computer node 102-1. The information contained in the message can include a write fault (to indicate that the message was sent because VCPU A attempted a write of queue page A but queue page A was not available at the computer node 102-1), an identification of VCPU A, and other information.

In response to receiving the message at the computer node 102-2, the machine learning module 204-2 in the migration engine instance 154-2 determines (at 314) based on the information in the message and information relating to queue page A at the computer node 102-2 whether queue page A is to be migrated to the computer node 102-1. Factors that are considered by the Markov model 208-2 in the machine learning module instance 204-2 in deciding whether or not to migrate queue page A is contention for queue page A. Contention for queue page A may be indicated by the VIOP-page affinity information 214-2 at the computer node 102-2. If the VIOP 136-2 is accessing queue page A, the VIOP-page affinity for the VIOP 136-2 and queue page A is set to the first value (as noted above) to prevent migration of queue page A so long as the VIOP 136-2 is actively accessing queue page A. Contention for queue page A may also exist if another entity (such as another VCPU or another entity) is accessing queue page A. In examples where a queue is assigned to only one VCPU, it is unlikely that another VCPU would be accessing queue page A. However, in other examples where a queue may be assigned to multiple VCPUs, then it is possible that more than one VCPU may contend for access of queue page A.

If there is no contention for queue page A, the migration engine 154-2 migrates (at 316) queue page A to the computer node 102-1. Once queue page A is migrated to the computer node 102-1, VCPU A can add a descriptor of an I/O access to queue page A. The VIOP 136-1 at the computer node 102-1 can read the descriptor form queue page A and initiate the I/O access.

However, if there is contention for queue page A, the migration engine 154-2 sends (at 318) a reject indication (e.g., a reject message, a reject information element, etc.) to the computer node 102-1. The reject indication is forwarded by the hyper-kernel instance 132-1 at the computer node 102-1 to VCPU A. The reject indication can include a retry indicator to indicate to VCPU A that its request for access of queue page A has been rejected but that VCPU A should retry the request at a later point in time, such as after some timeout interval.

The reject indication with retry is to allow the contention for queue page A to be resolved, such as due to the VIOP 136-2 or another entity completing the access of the queue page A. When VCPU A later retries the request for queue page A, and the contention no longer exists, the migration engine instance 154-2 can migrate queue page A to the computer node 102-1.

In other examples, instead of rejecting the request with a retry indicator, the migration engine instance 154-2 can simply send a busy indication back to the computer node 102-1 to notify VCPU A that there is currently an ongoing access of queue page A and the migration engine 154-1 will send queue page A to the computer node 102-1 when the access is complete.

Assuming that the machine learning module 204-2 decided that queue page A is to be migrated from the computer node 102-2 to the computer node 102-1, the machine learning module 204-2 also determines what state the queue page A should be set at when migrating to the computer node 102-1. The access frequency probability function instance 206-2 that is part of the machine learning module 204-2 produces a value indicating the frequency of reads or writes to queue page A.

As an example, the value produced by the access frequency probability function instance 206-2 can indicate a frequency of reads to queue page A. This value can be compared to a frequently read threshold to determine whether queue page A is a read-mostly page. If the value exceeds the frequently read threshold, then that indicates queue page A is a read-mostly page. If the value does not exceed the frequently read threshold, then that indicates queue page A is not a read-mostly page.

As another example, the value produced by the access frequency probability function instance 206-2 can indicate a frequency of writes to queue page A. This value can be compared to a frequently written threshold to determine whether queue page A is a read-mostly page. If the value is less than the frequently written threshold, then that indicates queue page A is a read-mostly page. If the value does exceed the frequently written threshold, then that indicates queue page A is not a read-mostly page.

Since it is likely that the queue page A is written with relatively high frequency (i.e., it is unlikely that queue page A is a read-mostly page), the machine learning module instance 206-2 can set (or keep) the queue page A in the read-write state. In such an example, the migration engine 154-2 migrates queue page A in the read-write state, which means that queue page A can be read from or written to after migration to the computer node 102-1.

Other possible states of a page can include a read-only state or an exec-only state. If the access frequency probability function instance 206-2 indicates that queue page A is a read mostly page, then the machine learning module instance 206-2 can set queue page A in the read-only state. In such an example, the migration engine 154-2 migrates queue page A in the read-only state, which means that queue page A can only be read from after migration to the computer node 102-1.

The access frequency probability function (including the multiple access frequency probability function instances 206-1 and 206-2) is also used by the coherency engine in deciding whether or not a queue page is to be replicated. Because a queue page is likely not to be a read-mostly page, the coherency engine can prevent replication of the queue page. In this manner, the coherency engine ensures there is just a single copy of the queue page, so that the coherency engine does not have to perform invalidations of queue page copies as part of a coherency protocol.

Figure 4:
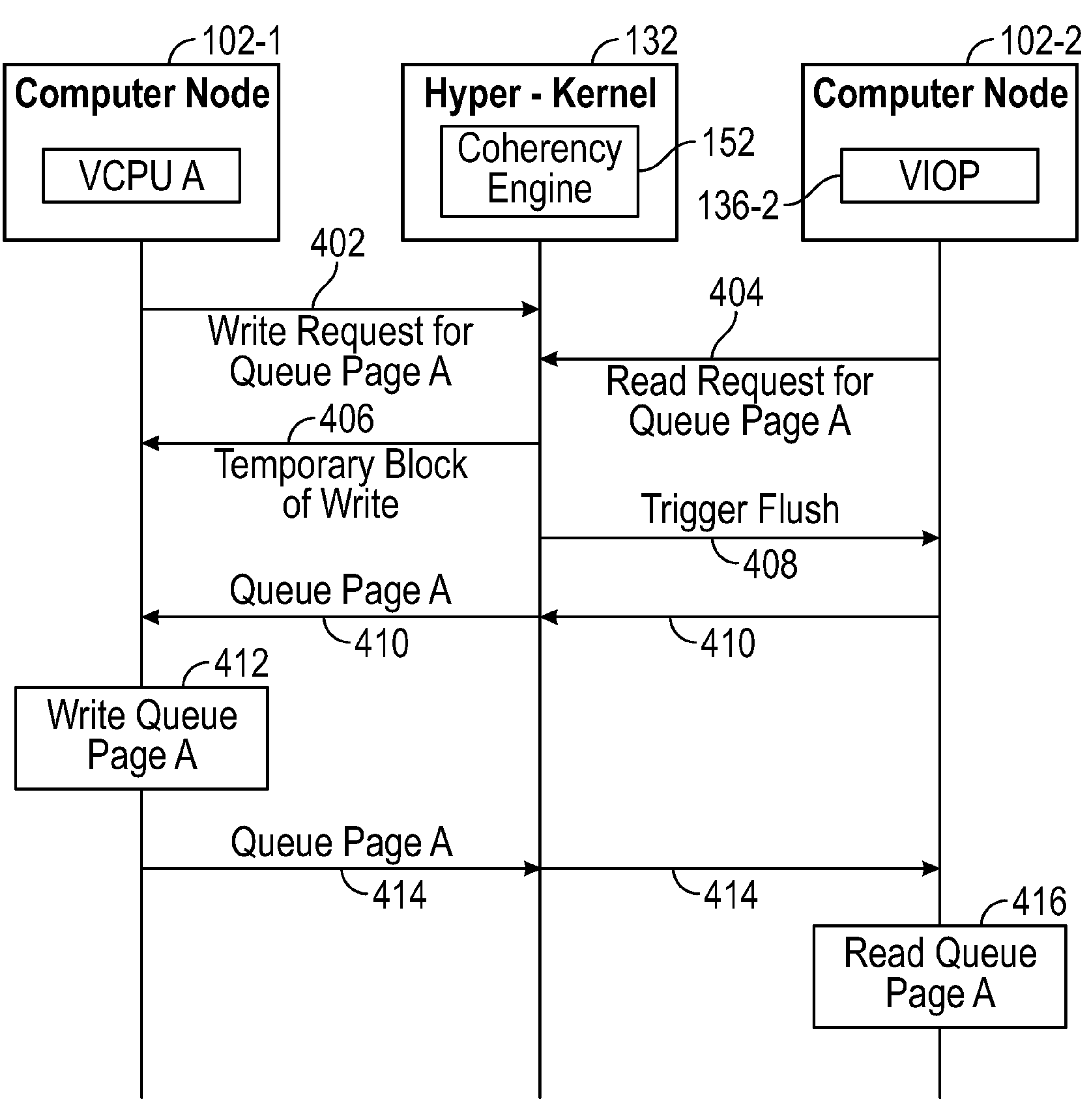

FIG. 4 is a flow diagram of an example process according to some examples. VCPU A in the computer node 102-1 issues (at 402) a write request to add a descriptor to queue page A (which is initially at the computer node 102-2). Subsequently, the VIOP 136-2 in the computer node 102-2 issues (at 404) a read request to access queue page A. A coherency engine 152 that is part of the hyper-kernel 132 maintains coherency in the content of queue page A by: (1) causing a flush any modified copies of queue page A to the shared storage system 116, and (2) ensuring that the VIOP 136-2 reads the latest version of the content of queue page A as updated by VCPU A. The coherency engine 152 includes coherency engine instances 152-1 and 152-2 in the example of FIG. 4.

In response to the write request from VCPU A and the read request from the VIOP 136-2, the coherency engine 152 issues (at 406) a temporary block of the write, by performing a permission change. The permission change can refer to changing a permission associated with queue page A to prohibit VCPU A from writing to queue page A. The permission can be part of the metadata associated with queue page A.

The coherency engine 152 triggers (at 408) a flush of any modified copies of queue page A (which may be stored in a cache memory). The coherency engine 152 can cause the computer node 102-2 to flush any modified copies of queue page A. If other computer nodes are present, the coherency engine 152 can also cause such other computer nodes to flush any modified copies of queue page A. The flush can be of a cache line (or another cache portion), for example.

After the flush has been completed, the hyper-kernel 132 (or more specifically, the migration engine in the hyper-kernel) migrates (at 410) queue page A from the computer node 102-2 to the computer node 102-1. The hyper-kernel 132 also changes the permission for VCPU A to be able to write to queue page A (to remove the temporary block issued at 406). At this point, VCPU A in the computer node 102-1 is able to write (at 412) to queue page A. After queue page A has been written to, the migration engine migrates (at 414) queue page A to the computer node 102-2, at which point the VIOP 136-2 can read (at 416) queue page A.

Figure 5:
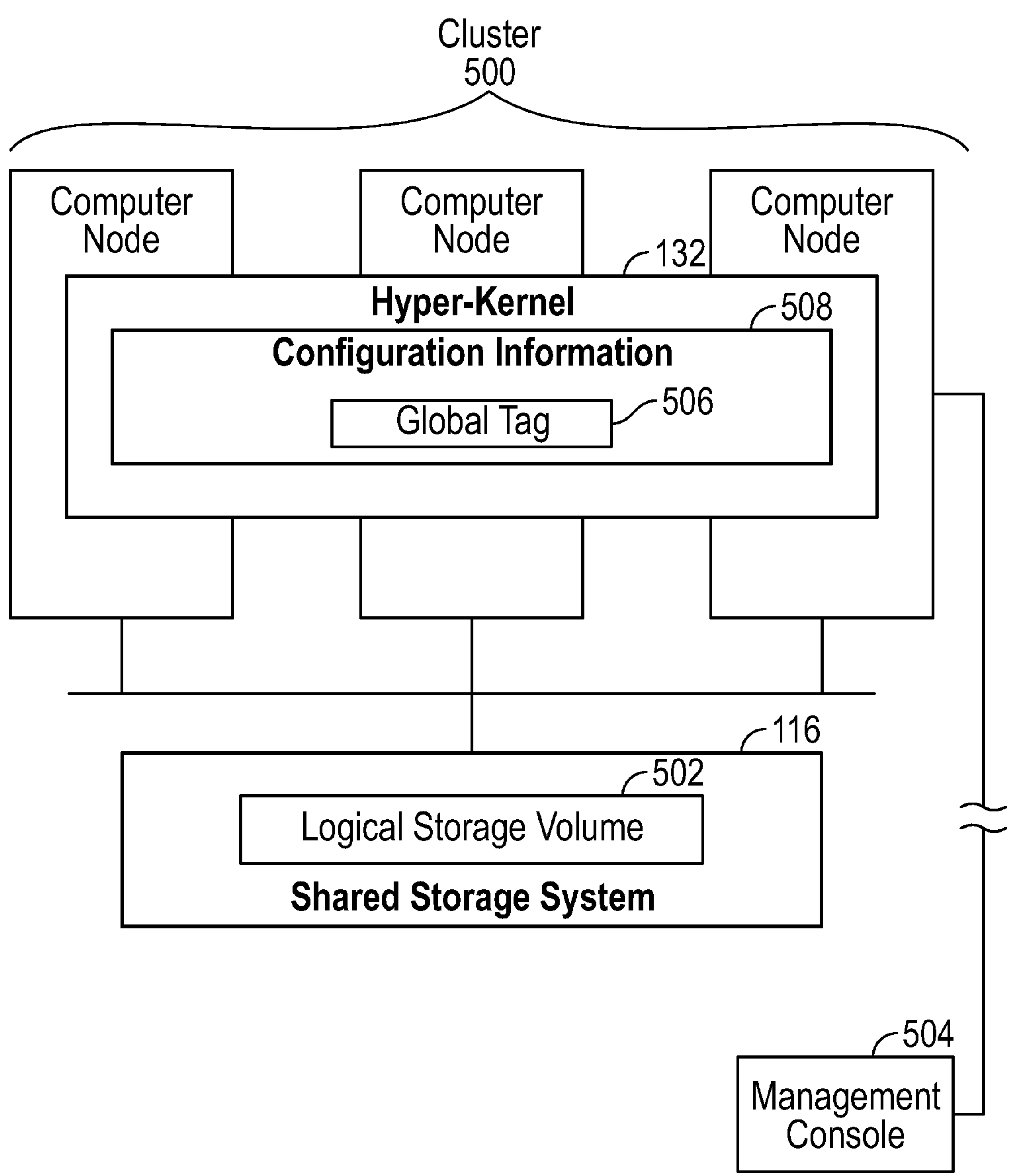
FIG. 5 is a block diagram of an arrangement that includes a cluster of computer nodes, a shared storage system, and a management console, according to some examples.

FIG. 5 is a block diagram of an example of how an indicator can be associated with a logical storage volume 502 to indicate that data of the logical storage volume should be accessible globally from any computer node of a cluster 500 of computer nodes, such as 102-1 to 102-N in FIG. 1. A "logical storage volume" refers to a logical storage structure, such as a logical unit (LU) identified by a logical unit number (LUN), to store data. Data of the logical storage volume 502 is to be stored in the shared storage system 116.

A user at a management console 504 (which can be a computer for example) assigns a global tag 506 to the logical storage volume 502. The management console 504 can communicate with the cluster 500 of computer nodes over a network.

The "global tag" includes an indicator (e.g., a predefined value, a flag, etc.) that the logical storage volume 502 is to be available from any computer node of the cluster of computer nodes. The global tag 506 is added to configuration information 508 stored by the hyper-kernel 132 on the cluster 500 of computer nodes. The global tag 506 in the configuration information 508 indicates to the hyper-kernel 132 that data of the logical storage volume 502 is to be accessed in parallel (such as across multiple paths provided by the I/O resources 112-1 to 112-N in respective computer nodes as shown in FIG. 1) for requests originated or received by respective computer nodes, and that each request should be locally handled by the receiving computer node to avoid sending I/O tasks of the request across multiple computer nodes. Based on the global tag 506, the hyper-kernel 132 creates a local path from each computer node to the logical storage volume 502 stored in the shared storage system 116.

Figure 6:
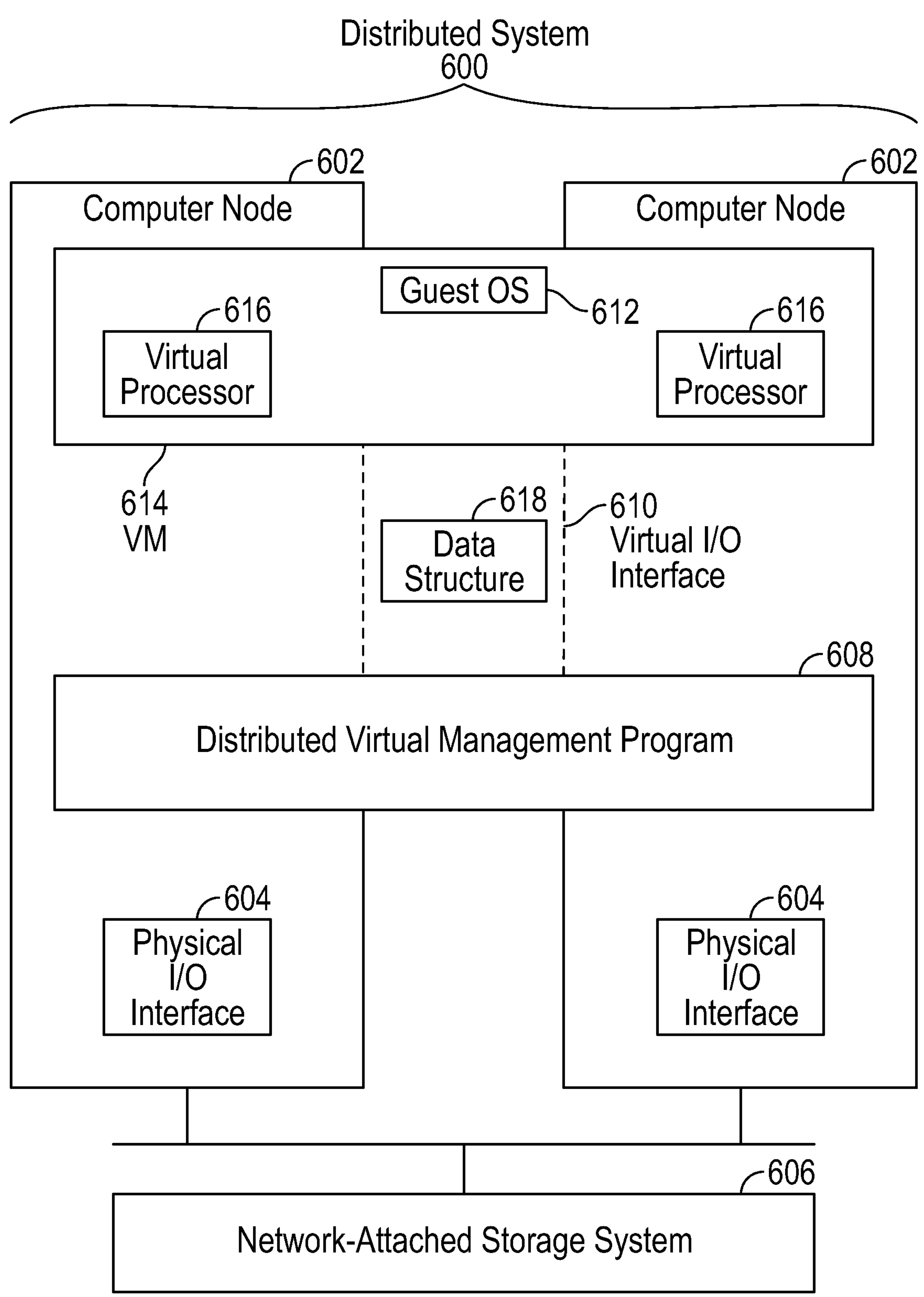
FIG. 6 is a block diagram of a distributed system according to some examples.

FIG. 6 is a block diagram of a distributed system 600 according to some examples. An example of the distributed system 600 is shown in FIG. 1. The distributed system 600 includes a plurality of computer nodes 602 including respective physical I/O interfaces 604 to a network-attached storage system 606.

The distributed system 600 includes a distributed virtual management program 608 to execute across the plurality of computer nodes 602. An example of the distributed virtual management program 608 is the hyper-kernel 132 shown in FIG. 1.

The distributed system 600 further includes a virtual I/O interface 610 between the distributed virtual management program 608 and a guest OS 612 of a VM 614. The VM 614 executes across the plurality of computer nodes 602. In some examples, the virtual I/O interface 610 includes a VirtIO interface, or more specifically, multiple VirtIO interfaces between respective virtual processors and VIOPs.

The distributed system 600 further includes a plurality of virtual processors 616 that execute in the VM 614. The plurality of virtual processors 616 are to access the network-attached storage system 606 through the virtual I/O interface 610 in parallel using the respective physical I/O interfaces. A first virtual processor in a first computer node of the plurality of computer nodes 602 is to use a data structure 618 in the virtual I/O interface 610 to submit a request to access data in the network-attached storage system 606. An example of the data structure 618 is a VirtIO queue. The first virtual processor is to further use the data structure 618 to receive a result of the request. The access of data from the network-attached storage system 606 to satisfy the request is performed locally at the first computer node using the physical I/O interface of the first computer node.

The distributed virtual management program 608 also maintains coherency of the data structure 618 across multiple computer nodes of the plurality of computer nodes 602.

In some examples, the coherency maintained by the distributed virtual management program 608 controls selective access of the data structure 618 by different entities including the first virtual processor and a virtual I/O processor in the first computer node.

In some examples, the first virtual processor is to add a representation (e.g., a descriptor) of the request to the data structure 618, and the virtual I/O processor is to add a result of the request to the data structure 618.

In some examples, the distributed virtual management program 608 is to arbitrate requests from different entities for the data structure 618, and as part of the arbitration, set an upper bound on a delay to be experienced by the first virtual processor when accessing the data structure 618.

In some examples, the coherency maintained by the distributed virtual management program 608 enforces that a single copy of the data structure 618 is present in the distributed system 600 for the first virtual processor.

In some examples, a plurality of data structures are assigned to respective virtual processors 616. The respective virtual processors 616 use the plurality of data structures to submit requests to access data in the network-attached storage system 606.

In some examples, the data structure 618 is assigned to only the first virtual processor.

In some examples, the data structure 618 is assigned to the first virtual processor and to at least one other virtual processor. The coherency maintained by the distributed virtual management program 608 controls access to the data structure 618 by the first virtual processor and the at least one other virtual processor.

In some examples, in response to the request from the first virtual processor, the distributed virtual management program 608 determines that the data structure 618 is in a second computer node, and in response to determining that the data structure 618 is in the second computer node, the distributed virtual management program 608 migrates the data structure 618 from the second computer node to the first computer node.

In some examples, prior to moving the data structure 618 from the second computer node to the first computer node, the distributed virtual management program 608 determines whether the data structure 618 is requested at the second computer node for updating the data structure 618 with a result for another request. In response to determining that the data structure is requested at the second computer node, the distributed virtual management program 608 delays moving the data structure 618 from the second computer node to the first computer node.

In some examples, the delay is based on the distributed virtual management program 608 sending a rejection indication in response to the request, the rejection indication to cause the first virtual processor to retry the request at a later time.

In some examples, in response to the request from the first virtual processor, the distributed virtual management program 608 applies a machine learning process to determine whether to move the data structure 618 from the second computer node to the first computer node. A decision of the machine learning process is based on an indication that a fault occurred at the first computer node in response to the request from the first virtual processor, and based on information relating to use of the data structure at the second computer node.

In some examples, the decision of the machine learning process is further based on an affinity between the first virtual processor and each computer node of the plurality of computer nodes 602.

In some examples, different virtual processors in different computer nodes 602 are to access, in parallel, data in the network-attached storage system 606 over respective local I/O connections of the different computer nodes 602.

In some examples, the distributed virtual management program 608 detects a global tag (e.g., 506 in FIG. 5) for a logical storage volume in the network-attached storage system 606. In response to detecting the global tag, the distributed virtual management program 608 performs local processing of requests at respective computer nodes of the plurality of computer nodes 602.

Figure 7:
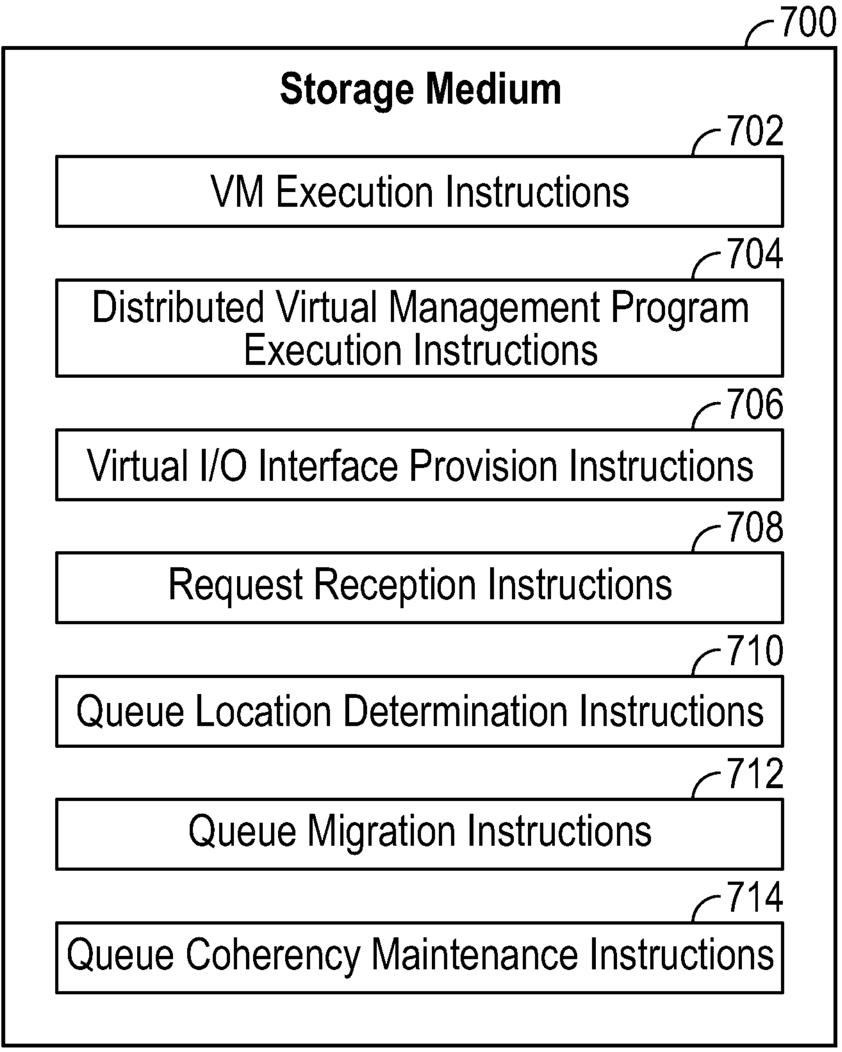
FIG. 7 is a block diagram of a storage medium storing machine-readable instructions according to some examples.

FIG. 7 is a block diagram of a non-transitory machine-readable or computer-readable storage medium 700 storing machine-readable instructions that upon execution cause a distributed system to perform various tasks. The machine-readable instructions include VM execution instructions 702 to execute a VM across a plurality of computer nodes that are connected by respective physical I/O interfaces to a network-attached storage system.

The machine-readable instructions include distributed virtual management program execution instructions 704 to execute instances of a distributed virtual management program in respective computer nodes of the plurality of computer nodes. The instances of the distributed virtual management program can include the hyper-kernel instances 132-1 to 132-N in FIG. 1.

The machine-readable instructions include virtual I/O interface provision instructions 706 to provide a virtual I/O interface between the distributed virtual management program and a guest OS of the VM. The virtual I/O interface includes queues useable by a plurality of virtual processors in the VM to request parallel access over the respective physical I/O interfaces of data in the network-attached storage system.

The machine-readable instructions include request reception instructions 708 to receive, at the distributed virtual management program, a request from a first virtual processor in a first computer node to use a first queue in the virtual I/O interface.

The machine-readable instructions include queue location determination instructions 710 to determine, with the distributed virtual management program, that the first queue is at a second computer node. The machine-readable instructions include queue migration instructions 712 to migrate, with the distributed virtual management program, the first queue from the second computer node to the first computer node to allow the first virtual processor to add information of the request to the first queue to allow an access of data from the network-attached storage system that satisfies the request locally using the physical I/O interface of the first computer node.

The machine-readable instructions include queue coherency maintenance instructions 714 to maintain, with the distributed virtual management program, coherency of the first queue across the first computer node and the second computer node.

Figure 8:
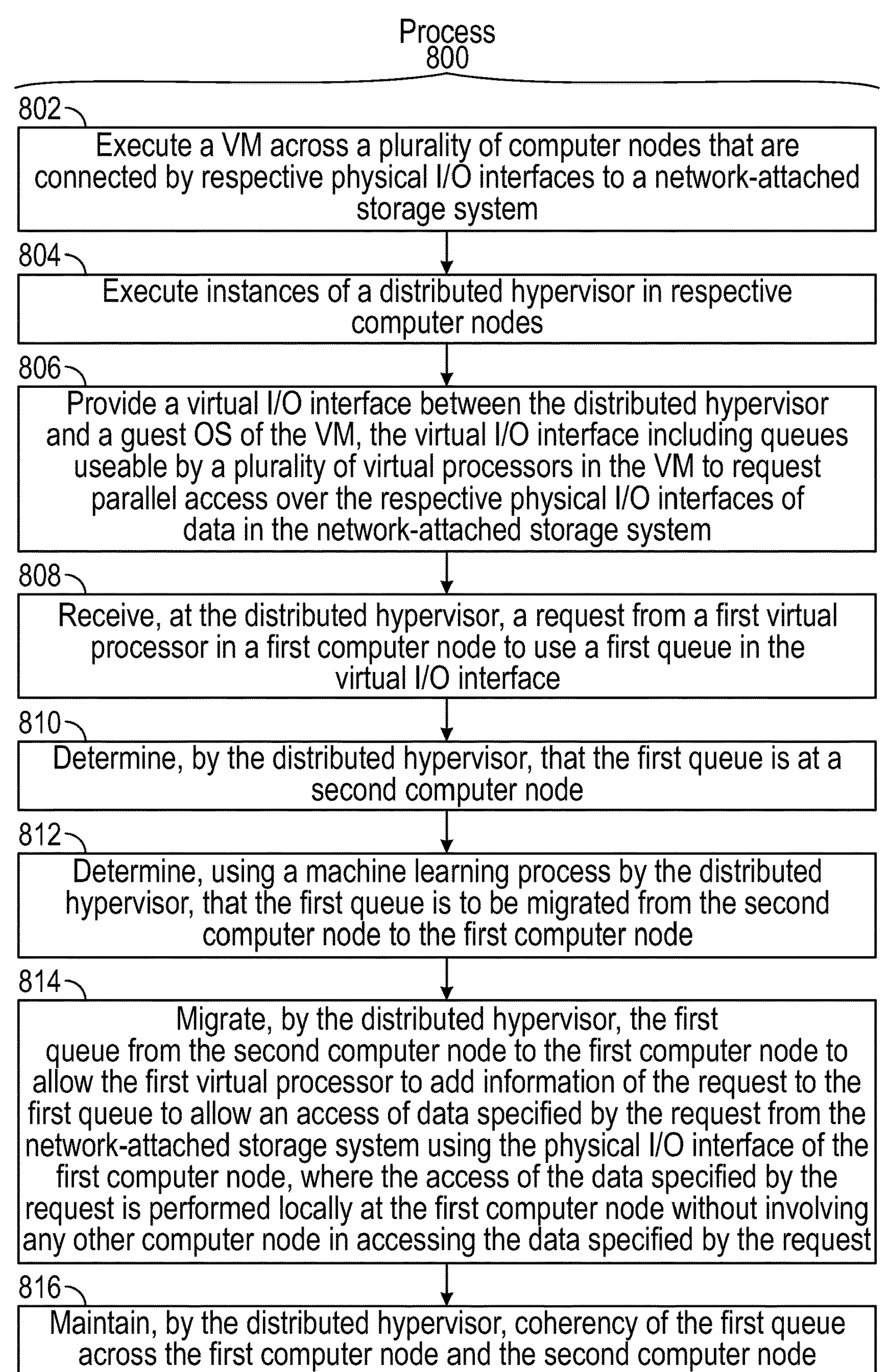
FIG. 8 is a flow diagram of a process according to some examples.

FIG. 8 is a flow diagram of a process 800 according to some examples, which can be performed in a distributed system.

The process 800 includes executing (at 802) a VM across a plurality of computer nodes that are connected by respective physical I/O interfaces to a network-attached storage system.

The process 800 includes executing (at 804) instances of a distributed hypervisor in respective computer nodes of the plurality of computer nodes. The process 800 includes providing (at 806) a virtual I/O interface between the distributed hypervisor and a guest OS of the VM, the virtual I/O interface including queues useable by a plurality of virtual processors in the VM to request parallel access over the respective physical I/O interfaces of data in the network-attached storage system.

The process 800 includes receiving (at 808), at the distributed hypervisor, a request from a first virtual processor in a first computer node to use a first queue in the virtual I/O interface. The process 800 includes determining (at 810), by the distributed hypervisor, that the first queue is at a second computer node.

The process 800 includes determining (at 812), using a machine learning process by the distributed hypervisor, that the first queue is to be migrated from the second computer node to the first computer node, where a decision of the machine learning process is based on information regarding use of the first queue at the second computer node and an affinity of the first virtual processor to each computer node of the plurality of computer nodes.

The process 800 includes migrating (at 814), by the distributed hypervisor, the first queue from the second computer node to the first computer node to allow the first virtual processor to add information of the request to the first queue to allow an access of data specified by the request from the network-attached storage system using the physical I/O interface of the first computer node, where the access of the data specified by the request is performed locally at the first computer node without involving any other computer node in accessing the data specified by the request.

The process 800 includes maintaining (at 816), by the distributed hypervisor, coherency of the first queue across the first computer node and the second computer node.

A storage medium (e.g., 700 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A distributed system comprising:

a plurality of computer nodes comprising respective physical input/output (I/O) interfaces to a network-attached storage system;

a distributed virtual management program to execute across the plurality of computer nodes;

a virtual I/O interface between the distributed virtual management program and a guest operating system (OS) of a virtual machine (VM), the VM to execute across the plurality of computer nodes, the virtual I/O interface comprising a queue to which descriptors of I/O tasks are added; and a plurality of virtual processors to execute in the VM and to access the network-attached storage system through the virtual I/O interface in parallel using the respective physical I/O interfaces, wherein a first virtual processor in a first computer node of the plurality of computer nodes is to add a first descriptor of an I/O task to a queue page of the queue in the virtual I/O interface to submit a request to access data in the network-attached storage system, and the first virtual processor is to receive a result of the request through the queue, and wherein the access of data in the network-attached storage system to satisfy the request is performed locally at the first computer node using the physical I/O interface of the first computer node, the distributed virtual management program to maintain coherency of the queue page across multiple computer nodes of the plurality of computer nodes by temporarily blocking the first virtual processor from writing to the queue page, and flushing a modified copy of the queue page from a cache in a computer node of the multiple computer nodes.

2. The distributed system of claim 1, wherein the coherency maintained by the distributed virtual management program controls selective access of the queue page by different entities including the first virtual processor and a virtual I/O processor.

3. The distributed system of claim 2, wherein the virtual I/O processor is to read the queue page.

4. The distributed system of claim 1, wherein the distributed virtual management program is to arbitrate requests from different entities for the queue page, and as part of the arbitration, set an upper bound on a delay to be experienced by the first virtual processor when accessing the queue page.

5. The distributed system of claim 1, wherein the distributed virtual management program is to:

after the flushing of the modified copy of the queue page, migrate the queue page from a second computer node to the first computer node, and change a permission of the queue page allowing the first virtual processor to write the first descriptor to the queue page in the first computer node.

6. The distributed system of claim 5, wherein the distributed virtual management program is to:

after the first descriptor has been written to the queue page in the first computer node, migrate the queue page to the second computer node allowing a virtual I/O processor to read the queue page in the second computer node.

7. The distributed system of claim 1, wherein the queue page is assigned to only the first virtual processor.

8. The distributed system of claim 1, wherein the queue page is assigned to the first virtual processor and to at least one other virtual processor, and wherein the coherency maintained by the distributed virtual management program controls access to the queue page by the first virtual processor and the at least one other virtual processor.

9. The distributed system of claim 1, wherein the distributed virtual management program is to:

in response to the request from the first virtual processor, determine that the queue page is in a second computer node; and in response to determining that the queue page is in the second computer node, migrate the queue page from the second computer node to the first computer node.

10. The distributed system of claim 9, wherein the first virtual processor is in the first computer node and the queue page is in the second computer node responsive to the first virtual processor migrating from the second computer node to the first computer node.

11. The distributed system of claim 9, wherein the distributed virtual management program is to:

prior to moving the queue page from the second computer node to the first computer node, determine whether the queue page is requested at the second computer node for updating the queue page with a result for another request; and in response to determining that the queue page is requested at the second computer node, delay moving the queue page from the second computer node to the first computer node.

12. The distributed system of claim 11, wherein the delay is based on the distributed virtual management program sending a rejection indication in response to the request, the rejection indication to cause the first virtual processor to retry the request at a later time.

13. The distributed system of claim 9, wherein the distributed virtual management program is to:

in response to the request from the first virtual processor, apply a machine learning process to determine whether to move the queue page from the second computer node to the first computer node, wherein a decision of the machine learning process is based on an indication that a fault occurred at the first computer node in response to the request from the first virtual processor, and based on information relating to use of the queue page at the second computer node.

14. The distributed system of claim 13, wherein the decision of the machine learning process is further based on an affinity between the first virtual processor and each computer node of the plurality of computer nodes.

15. The distributed system of claim 1, wherein different virtual processors in different computer nodes are to access, in parallel, data in the network-attached storage system over respective local I/O connections of the different computer nodes.

16. The distributed system of claim 1, wherein the distributed virtual management program is to:

detect a global tag for a logical storage volume in the network-attached storage system; and in response to detecting the global tag, perform local processing of requests at respective computer nodes of the plurality of computer nodes.

17. A non-transitory machine-readable storage medium comprising instructions that upon execution cause a distributed system to:

execute a virtual machine (VM) across a plurality of computer nodes that are connected by respective physical input/output (I/O) interfaces to a network-attached storage system;

execute instances of a distributed virtual management program in respective computer nodes of the plurality of computer nodes;

provide a virtual I/O interface between the distributed virtual management program and a guest operating system (OS) of the VM, the virtual I/O interface comprising queues useable by a plurality of virtual processors in the VM to request parallel access over the respective physical I/O interfaces of data in the network-attached storage system;

receive, at the distributed virtual management program, a request from a first virtual processor in a first computer node to use a first queue in the virtual I/O interface;

determine, with the distributed virtual management program, that the first queue is at a second computer node;

migrate, with the distributed virtual management program, the first queue from the second computer node to the first computer node to allow the first virtual processor to add information of the request to the first queue to allow an access of data from the network-attached storage system that satisfies the request locally using the physical I/O interface of the first computer node; and maintain, with the distributed virtual management program, coherency of the first queue across the first computer node and the second computer node by temporarily blocking the first virtual processor from writing to the first queue, and flushing a modified copy of a queue page of the first queue from a cache in a computer node of the first and second computer nodes.

18. The non-transitory machine-readable storage medium of claim 17, wherein the migrating of the first queue comprises migrating one or more pages of the first queue from the second computer node to the first computer node.

19. A method of a distributed system, comprising:

executing a virtual machine (VM) across a plurality of computer nodes that are connected by respective physical input/output (I/O) interfaces to a network-attached storage system;

executing instances of a distributed hypervisor in respective computer nodes of the plurality of computer nodes;

providing a virtual I/O interface between the distributed hypervisor and a guest operating system (OS) of the VM, the virtual I/O interface comprising queues useable by a plurality of virtual processors in the VM to request parallel access over the respective physical I/O interfaces of data in the network-attached storage system;

receiving, at the distributed hypervisor, a request from a first virtual processor in a first computer node to use a first queue in the virtual I/O interface;

determining, by the distributed hypervisor, that the first queue is at a second computer node;

determining, using a machine learning process by the distributed hypervisor, that the first queue is to be migrated from the second computer node to the first computer node, wherein a decision of the machine learning process is based on information regarding use of the first queue at the second computer node and an affinity of the first virtual processor to each computer node of the plurality of computer nodes;

migrating, by the distributed hypervisor, the first queue from the second computer node to the first computer node to allow the first virtual processor to add information of the request to the first queue to allow an access of data specified by the request from the network-attached storage system using the physical I/O interface of the first computer node, wherein the access of the data specified by the request is performed locally at the first computer node without involving any other computer node in accessing the data specified by the request; and maintaining, by the distributed hypervisor, coherency of the first queue across the first computer node and the second computer node by temporarily blocking the first virtual processor from writing to the first queue, and flushing a modified copy of a queue page of the first queue from a cache in a computer node of the first and second computer nodes.

20. The method of claim 19, wherein the machine learning process is weighted to favor keeping the first virtual processor at the first computer node and migrating the first queue to allow local processing of the request at the first computer node.

* * * * *